E. FISCHER.
PROCESS FOR THE EXTRACTION OF FAT FROM BONES, MATERIALS SUITABLE FOR GLUE MANUFACTURE, AND LIKE SUBSTANCES.
APPLICATION FILED JAN. 16, 1912.
1,114,598.
Patented Oct. 20, 1914.
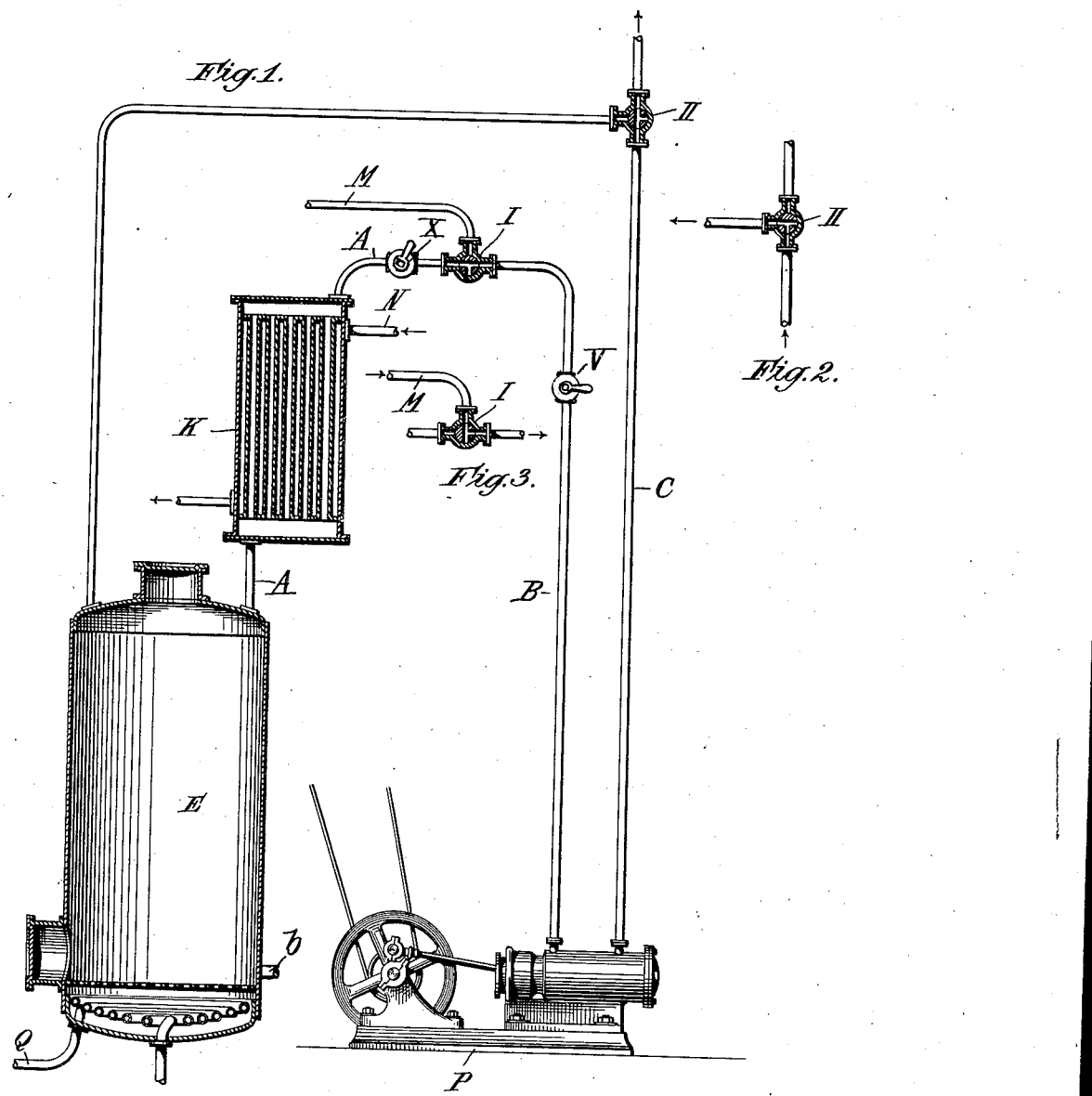

UNITED STATES PATENT OFFICE.

ERNST FISCHER, OF CHARLOTTENBURG, GERMANY.

PROCESS FOR THE EXTRACTION OF FAT FROM BONES, MATERIALS SUITABLE FOR GLUE MANUFACTURE, AND LIKE SUBSTANCES.

1,114,598.  Specification of Letters Patent. Patented Oct. 20, 1914.

Application filed January 16, 1912. Serial No. 671,451.

*To all whom it may concern:*

Be it known that I, Dr. ERNST FISCHER, chemist, resident of Charlottenburg, near Berlin, subject of the Emperor of Austria-Hungary, have invented a new and useful Process for the Extraction of Fat from Bones, Materials Suitable for Glue Manufacture, and the like Substances, of which the following is a specification.

Bones, materials suitable for glue manufacture and like substances hereinafter termed glue material are as well understood treated for fat removal before being used for the preparation of glue. Such treatment is accomplished by extracting the fat with benzin or other fat solvent or solvents in apparatus of known construction. In the most usual type of such apparatus the extraction is effected under atmospheric pressure, but working in vacuum has been repeatedly suggested.

Apparatus which work under atmospheric pressure require as will be understood a greater expenditure of heat than apparatus in which the extraction is effected in vacuum whereby the boiling point of the solvent employed is greatly reduced. Moreover since it is also known that the glue material is the less likely to be injuriously affected and the more likely to be kept in a condition which is useful for the purpose to which it is to be subsequently put, the less the heat to which it is subjected, it is advantageous to carry out the extraction of the fat at as low a temperature as is possible, a condition which is likewise in favor of the vacuum extraction apparatus. Such apparatus however has not met with general favor in practice, the reason presumably being the insufficient consideration of the conditions under which the extraction of the fat takes place. The improved process for the extraction of fat from the materials stated is a result of a close investigation of these conditions.

A property which is common to raw glue materials generally is that the fat contained in them is deposited in an extremely fine state of subdivision in pores or passages that contain at the same time considerable quantities of air. The extracting agent employed for dissolving the fat needs to penetrate these pores or passages and expel the air therefrom before it can exert adequate action upon the fat. It is obvious also that the solvent exerts its action on the fat only when such solvent is in a liquid state and not when in a state of vapor. When working under ordinary pressure the air inclosed in the pores is only very slowly expelled by the solvent. The use of a vacuum shortens the process very considerably in that it withdraws the air from the pores. At the same time however the vacuum causes an increased vaporization of the solvent so that the solvent which has already penetrated into the pores is caused to boil and expels the air therefrom. As soon as the latter is expelled what may be termed a state of resistance is set up in which the pores are filled with vaporous solvent which has little if any dissolving action upon the fat. Only after the restoration of the normal atmospheric pressure is the compression of the vapor contained in the pores and its condensation to liquid completed, and only then does the solvent action commence. Since however in apparatus as ordinarily employed the glue materials are not completely submerged in the extracting agent, but are only washed thereby, it follows that on readmitting air and restoring the pressure to normal the pores are only partially filled with liquid and are again partially filled with air, so that a sufficient extraction by the liquid solvent cannot take place.

Now according to this invention the hereinbefore mentioned disadvantages are obviated by forcing into the apparatus, after the air has been completely withdrawn from the glue material and the pores thereof have been filled with the vapor of the solvent, vapors of the same or if desired of other fat solvent, in such quantity as to produce pressure sufficient to cause complete condensation of the vaporous solvent present in the glue material. This pressure differs with different solvents and may be more or less than one atmosphere according to requirement. By working in this manner it is possible to avoid subjecting the glue material to so high a temperature that it would be injuriously affected and yet to thoroughly permeate it with the solvent in a liquid state whereby the extraction of the fat is considerably accelerated and rendered more complete than heretofore possible when the extraction is effected by the hitherto known processes.

Figure 1 of the accompanying illustrative drawing is a sectional view of apparatus suitable for carrying out the improved process. Figs. 2 and 3 show the valves thereof in another position.

E is the extracting chamber into which the material to be extracted is charged. From this chamber a pipe (A and B) leads by way of a three-way cock I and through a cooler K to a pump P. From the latter the pipe C leads by way of a three-way cock II to the atmosphere, it may be after first passing through a silencer. The position of the cocks shown in Fig. 1 corresponds to the vacuum period. In the delivery period the cock I is moved into the position shown in Fig. 3 and the cock II into that shown in Fig. 2. The pipe M is connected to a vessel charged with benzin and in which vapors of benzin are generated and the pipe N is connected to the water supply.

Q is a pipe through which steam flows and which serves to heat the extracting chamber E. In the process of extraction the apparatus E is charged with the fat-containing material and closed in an airtight manner. A liquid solvent (benzin) is then admitted in the usual way, viz. through the pipe $b$. Instead of delivering the benzin through the pipe $b$ it may be taken direct from the source of vapor supply, viz. through pipe M, valve I, pipe A, and the condenser K. The cocks are set as shown in Fig. 1 and the pump P started. As soon as the apparatus E has vacuum formed in it, the solvent is vaporized until the state of resistance hereinbefore referred to is reached. The cocks are then moved into the positions shown in Figs. 2 and 3 and benzin vapor admitted into the extractor until the pressure prevailing in the apparatus is that at which the greater part of the vapor is condensed to a liquid. During this operation the water supply to the condenser is cut off, or the extractor may be subjected to pressure by means of a valve V in the delivery pipe B of the pump and a valve X in the pipe A between the condenser and the three way cock I. The benzin containing the fat in solution collects in the bottom of the apparatus E and is then drawn off into a vessel provided for the purpose and the process repeated until the whole of the fat in the material undergoing extraction treatment has been dissolved and extracted.

It is to be understood that the apparatus illustrated is only referred to by way of example; any other suitably constructed apparatus can be employed.

Having now particularly described and ascertained the nature of the said invention and in what manner the same is to be performed, I declare that what I claim is:—

1. The process of recovering fat from materials containing the same which consists in treating the material with a liquid solvent, and subjecting such material to reduced pressure to vaporize the solvent and open the pores in the material to expel the air; and then admitting solvent vapors and working under less reduced pressure to condense the vapors for dissolving the fat.

2. The process of recovering fat from materials containing the same which consists in treating the material with liquid benzin and subjecting the saturated material to reduced pressure to vaporize the solvent, and open the pores in the material to expel the air; and then admitting benzin vapors free from air to penetrate the open pores, and working under less reduced pressure to condense such vapors for dissolving the fat.

In testimony, that I claim the foregoing as my invention, I have signed my name in presence of two witnesses, this 2nd day of January, 1912.

Dr. ERNST FISCHER.

Witnesses:
 August Fugger,
 Ada Maria Berger.